United States Patent
Sanchez et al.

(10) Patent No.: US 12,361,769 B1
(45) Date of Patent: Jul. 15, 2025

(54) SYSTEMS AND METHODS FOR DETERMINING A VEHICLE DRIVER BASED ON MOBILE DEVICE USAGE DURING HIGH ATTENTION DRIVING EVENTS

(71) Applicant: QUANATA, LLC, San Francisco, CA (US)

(72) Inventors: Kenneth Jason Sanchez, San Francisco, CA (US); Blake Konrardy, Chicago, IL (US); Fang Fang, San Jose, CA (US)

(73) Assignee: QUANATA, LLC, San Francisco, CA (US)

( * ) Notice: Subject to any disclaimer, the term of this patent is extended or adjusted under 35 U.S.C. 154(b) by 621 days.

(21) Appl. No.: 17/673,560

(22) Filed: Feb. 16, 2022

Related U.S. Application Data

(60) Provisional application No. 63/154,329, filed on Feb. 26, 2021.

(51) Int. Cl.
| | |
|---|---|
| *H04W 4/02* | (2018.01) |
| *G07C 5/00* | (2006.01) |
| *G07C 5/04* | (2006.01) |
| *G07C 5/08* | (2006.01) |
| *H04W 4/029* | (2018.01) |
| *H04W 4/40* | (2018.01) |
| *G06Q 40/08* | (2012.01) |

(52) U.S. Cl.
CPC ............... *G07C 5/04* (2013.01); *G07C 5/008* (2013.01); *G07C 5/0808* (2013.01); *H04W 4/02* (2013.01); *H04W 4/029* (2018.02); *H04W 4/40* (2018.02); *G06Q 40/08* (2013.01)

(58) Field of Classification Search
CPC ................................ H04W 4/02; H04W 4/029
See application file for complete search history.

(56) References Cited

U.S. PATENT DOCUMENTS

| | | |
|---|---|---|
| 9,628,958 B1 | 4/2017 | McBurney |
| 9,870,649 B1 | 1/2018 | Fields |
| 10,026,237 B1 | 7/2018 | Fields |
| (Continued) | | |

FOREIGN PATENT DOCUMENTS

| | | |
|---|---|---|
| CA | 3052234 | 8/2018 |
| CA | 3069511 | 1/2019 |
| (Continued) | | |

*Primary Examiner* — Barry W Taylor
(74) *Attorney, Agent, or Firm* — BRYAN CAVE LEIGHTON PAISNER LLP

(57) ABSTRACT

Method and system for determining whether a user of a mobile device is a driver of a vehicle. For example, the method includes receiving telematics data and device interaction data collected by the mobile device during vehicle trip segments, analyzing the telematics data to determine first driving events of a predetermined type during the vehicle trip segments, determining second driving events of the predetermined type during which the user interacts with the mobile device by correlating the telematics data and the device interaction data, calculating a ratio of the number of the second driving events to the number of the first driving events, and determining whether or not the user of the mobile device is the driver of the vehicle during the vehicle trip segments by comparing the ratio to a predetermined threshold.

20 Claims, 5 Drawing Sheets

(56) References Cited

U.S. PATENT DOCUMENTS

| | | |
|---|---|---|
| 10,163,350 B1 | 12/2018 | Fields et al. |
| 10,414,407 B1 | 9/2019 | Slusar |
| 10,950,065 B1 | 3/2021 | Fields |
| 10,977,945 B1 | 4/2021 | Fields |
| 11,107,365 B1 | 8/2021 | Fields |
| 11,242,064 B1 | 2/2022 | Ferguson |
| 11,587,368 B2 | 2/2023 | Cordova |
| 11,615,478 B2 | 3/2023 | Chintakindi et al. |
| 2012/0214463 A1 | 8/2012 | Smith et al. |
| 2016/0101785 A1* | 4/2016 | Takahashi ............ B60K 28/066 701/31.4 |
| 2017/0021764 A1 | 1/2017 | Adams et al. |
| 2017/0105098 A1 | 4/2017 | Cordova |
| 2017/0279957 A1* | 9/2017 | Abramson et al. ..... G06F 21/36 |
| 2018/0012092 A1 | 1/2018 | Gleeson-May |
| 2018/0075380 A1 | 3/2018 | Perl et al. |
| 2019/0005412 A1 | 1/2019 | Matus |
| 2019/0052747 A1 | 2/2019 | Breaux et al. |
| 2019/0287180 A1 | 9/2019 | Vartanian |
| 2020/0045505 A1* | 2/2020 | Cordova ............... H04W 4/023 |
| 2020/0175786 A1 | 6/2020 | Bongers |
| 2021/0272207 A1 | 9/2021 | Fields |
| 2022/0172295 A1 | 6/2022 | Grandy et al. |
| 2022/0194391 A1 | 6/2022 | Ferguson |
| 2022/0253941 A1 | 8/2022 | Gouda et al. |
| 2022/0270177 A1* | 8/2022 | Chintakindi .......... H04W 4/029 |
| 2022/0292605 A1* | 9/2022 | Sanchez ............... G06V 20/597 |
| 2023/0113454 A1 | 4/2023 | Sanchez et al. |
| 2023/0308862 A1 | 9/2023 | Sanchez et al. |

FOREIGN PATENT DOCUMENTS

| | | |
|---|---|---|
| CA | 3034513 | 8/2019 |
| CA | 3130517 | 3/2023 |
| WO | 2010062899 | 6/2010 |

* cited by examiner

SYSTEMS AND METHODS FOR DETERMINING A VEHICLE DRIVER BASED ON MOBILE DEVICE USAGE DURING HIGH ATTENTION DRIVING EVENTS

CROSS-REFERENCE TO RELATED APPLICATIONS

This application claims priority to U.S. Provisional Patent Application No. 63/154,329, filed Feb. 20, 2021, incorporated by reference herein for all purposes.

The following four applications, including this one, are being filed concurrently and the other three are hereby incorporated by reference in their entirety for all purposes:
1. U.S. patent application Ser. No. 17/673,560, titled "Systems and Methods for Determining a Vehicle Driver Based on Mobile Device Usage During High Attention Driving Events";
2. U.S. patent application Ser. No. 17/673,571, titled "Systems and Methods for Determining a Vehicle Driver Based on Mobile Device Usage During Low Attention Driving Events";
3. U.S. patent application Ser. No. 17/673,578, titled "Systems and Methods for Determining Which Mobile Device Among Multiple Mobile Devices is Used by a Vehicle Driver"; and
4. U.S. patent application Ser. No. 17/673,589, titled "Systems and Methods for Validating a Vehicle Driver Based on Mobile Device Positions Within a Vehicle".

FIELD OF THE DISCLOSURE

Some embodiments of the present disclosure are directed to determining which vehicle occupant is a vehicle driver. More particularly, certain embodiments of the present disclosure provide methods and systems for determining the vehicle driver by analyzing telematics data and device interaction data received from a mobile device during high attention driving events. Merely by way of example, the present disclosure has been applied to determining whether a user of the mobile device is the vehicle driver in order to accurately attribute driving behaviors to the vehicle driver. But it would be recognized that the present disclosure has much broader range of applicability.

BACKGROUND OF THE DISCLOSURE

A driver's driving behavior during a vehicle trip can be monitored for insurance related purposes. For example, various data generated by a mobile device of the driver are collected and analyzed to determine whether the driver was practicing safe driving. When the driver is accompanied by one or more passengers during the vehicle trip, a problem arises when a passenger uses or interacts with the driver's mobile device. Conventional systems would attribute the passenger's interactions to the driver and thus classify the driver as being distracted while driving. This misclassification can negatively impact the driver's insurance ratings. Accordingly, there exists a need to determine whether the driver or the passenger is using the mobile device during the vehicle trip so that data collected from the mobile device can be used to accurately assess the driver's driving behavior and not have any of the passenger's behavior imparted onto the driver.

BRIEF SUMMARY OF THE DISCLOSURE

Some embodiments of the present disclosure are directed to determining which vehicle occupant is a vehicle driver. More particularly, certain embodiments of the present disclosure provide methods and systems for determining the vehicle driver by analyzing telematics data and device interaction data received from a mobile device during high attention driving events. Merely by way of example, the present disclosure has been applied to determining whether a user of the mobile device is the vehicle driver in order to accurately attribute driving behaviors to the vehicle driver. But it would be recognized that the present disclosure has much broader range of applicability.

According to certain embodiments, a method for determining whether or not a user of a mobile device is a driver of a vehicle includes receiving telematics data and device interaction data collected by the mobile device during one or more vehicle trip segments. The one or more vehicle trip segments are made by the driver of the vehicle. Also, the method includes analyzing the telematics data to determine one or more first driving events of a predetermined type during the one or more vehicle trip segments. Additionally, the method includes determining one or more second driving events of the predetermined type during which the user interacts with the mobile device by correlating the telematics data and the device interaction data, where the one or more second driving events are selected from the one or more first driving events. Further, the method includes calculating a ratio of the number of the one or more second driving events to the number of the one or more first driving events. Moreover, the method includes determining whether or not the user of the mobile device is the driver of the vehicle during the one or more vehicle trip segments by comparing the ratio to a predetermined threshold.

According to some embodiments, a computing device for determining whether or not a user of a mobile device is a driver of a vehicle includes one or more processors and a memory storing instructions for execution by the one or more processors. The instructions, when executed, cause the one or more processors to receive telematics data and device interaction data collected by the mobile device during one or more vehicle trip segments. The one or more vehicle trip segments are made by the driver of the vehicle. Also, the instructions, when executed, cause the one or more processors to analyze the telematics data to determine one or more first driving events of a predetermined type during the one or more vehicle trip segments. Additionally, the instructions, when executed, cause the one or more processors to determine one or more second driving events of the predetermined type during which the user interacts with the mobile device by correlating the telematics data and the device interaction data, where the one or more second driving events are selected from the one or more first driving events. Further, the instructions, when executed, cause the one or more processors to calculate a ratio of the number of the one or more second driving events to the number of the one or more first driving events. Moreover, the instructions, when executed, cause the one or more processors to determine whether or not the user of the mobile device is the driver of the vehicle during the one or more vehicle trip segments by comparing the ratio to a predetermined threshold.

According to certain embodiments, a method for determining whether or not a user of a mobile device is a driver of a vehicle during multiple vehicle trip segments includes analyzing each trip segment and the multiple trip segments as a whole. For each segment of the multiple vehicle trip segments, the method includes receiving telematics data and device interaction data collected by the mobile device during the segment made by the driver of the vehicle, analyzing the telematics data to determine one or more first driving events of a predetermined type during the segment, determining one or more second driving events of the predetermined type during which the user interacts with the mobile device by correlating the telematics data and the device interaction data, calculating a ratio of the number of the one or more second driving events to the number of the one or more first driving events, and determining whether or not the user of the mobile device is the driver of the vehicle during the segment by comparing the ratio to a predetermined threshold. The one or more second driving events are selected from the one or more first driving events. For the multiple vehicle trip segments, the method includes determining a first number of segments for which the user of the mobile device is determined to be the driver of the vehicle during each segment, determining a second number of segments for which the user of the mobile device is determined not to be the driver of the vehicle during each segment, processing information associated with the first number of segments and the second number of segments, and determining whether or not the user of the mobile device is the driver of the vehicle during the multiple vehicle trip segments based at least in part upon the first number of segments and the second number of segments.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Some embodiments of the present disclosure are directed to determining which vehicle occupant is a vehicle driver. More particularly, certain embodiments of the present disclosure provide methods and systems for determining the vehicle driver by analyzing telematics data and device interaction data received from a mobile device during high attention driving events. Merely by way of example, the present disclosure has been applied to determining whether a user of the mobile device is the vehicle driver in order to accurately attribute driving behaviors to the vehicle driver. But it would be recognized that the present disclosure has much broader range of applicability.

Figure 1:
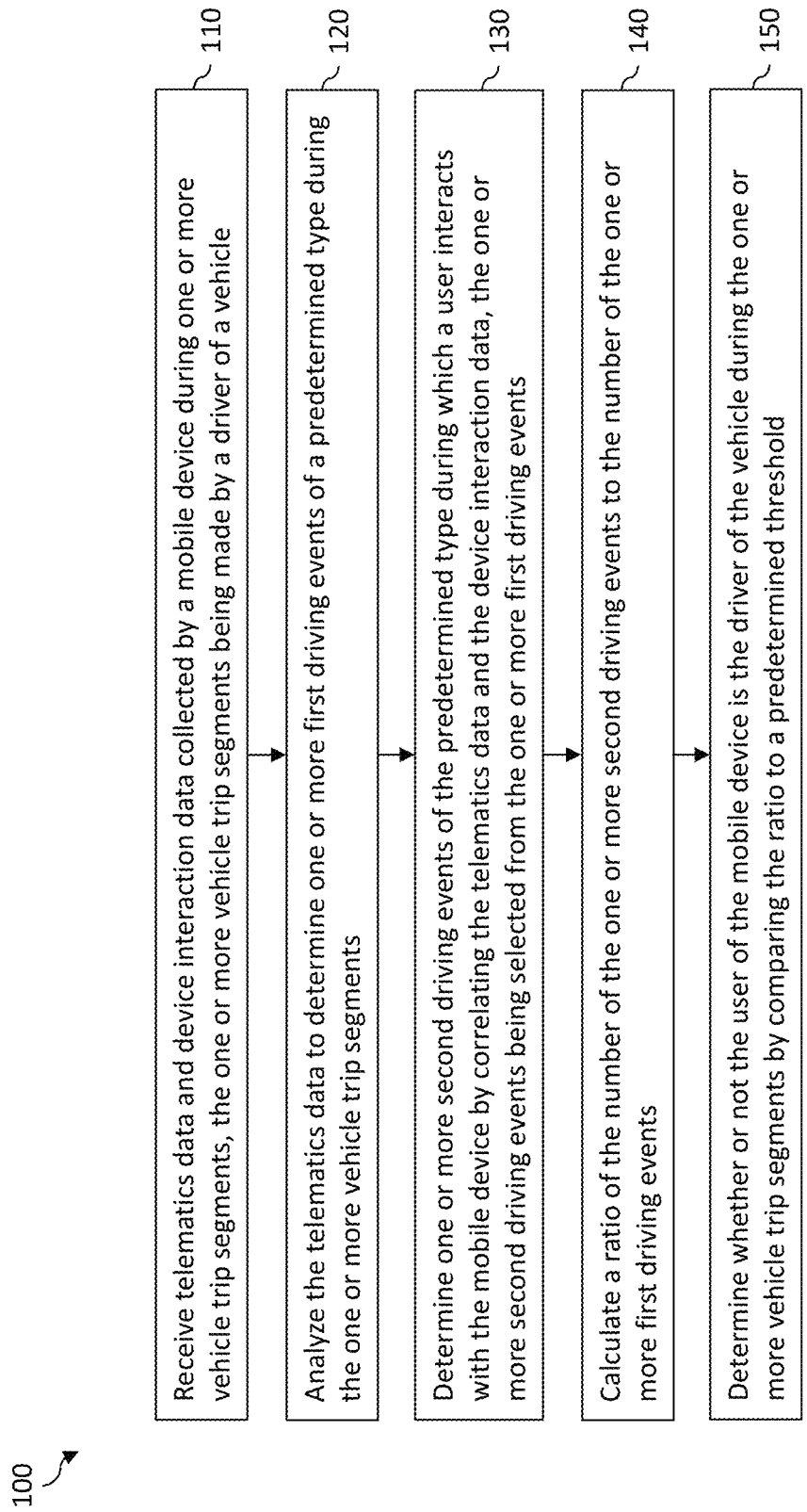
FIG. 1 shows a simplified method for determining whether a user of a mobile device is a vehicle driver according to certain embodiments of the present disclosure.

I. One or More Methods for Determining Whether a User of a Mobile Device is a Vehicle Driver According to Certain Embodiments FIG. 1 shows a simplified method for determining whether a user of a mobile device is a driver of a vehicle according to certain embodiments of the present disclosure. This figure is merely an example, which should not unduly limit the scope of the claims. One of ordinary skill in the art would recognize many variations, alternatives, and modifications. The method 100 includes process 110 for receiving telematics data and device interaction data, process 120 for determining first driving events, process 130 for determining second driving events, process 140 for calculating a ratio based upon the first driving events and the second driving events, and process 150 for determining whether the user of the mobile device is the driver of the vehicle. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 110, the telematics data and the device interaction data are collected by the mobile device during one or more vehicle trip segments according to certain embodiments. In some embodiments, the telematics data indicate driving maneuvers made during the one or more vehicle trip segments (e.g., braking, acceleration, cornering, stopping, etc.). In certain embodiments, the device interaction data indicate user interactions with the mobile device during the one or more vehicle trip segments (e.g., turning the mobile device on/off, moving the mobile device, viewing the mobile device, texting, making a phone call, interacting with an application on the mobile device, etc.). In various embodiments, the telematics data and/or the device interaction data are collected by one or more sensors in the mobile device, such as accelerometers, gyroscopes, magnetometers, location sensors (e.g., GPS sensors), cameras, gaze sensors, and/or other suitable sensors.

In certain embodiments, the one or more vehicle trip segments are made by the driver of the vehicle. For example, the one or more vehicle trip segments are made by the driver to commute to and from work. As an example, the one or more vehicle trip segments are made by the driver in running errands (e.g., grocery shopping, going to the pharmacy, dropping off packages at the post office, picking up kids from school, etc.). For example, the one or more vehicle trip segments are made by the driver for any suitable personal and/or business reasons (e.g., city travels, road trips, business trips, family vacations, etc.). In some embodiments, various trip segments are selected and aggregated to form the one or more vehicle trip segments. For example, the one or more vehicle trip segments include any or all trip segments from multiple different trips. As an example, the one or more vehicle trip segments include any or all trip segments from the same trip. In certain embodiments, each trip segment in the one or more vehicle trip segments is selected based on factors such as driving time, driving distance, fuel cost, etc.

At the process 120, the telematics data are analyzed to determine one or more first driving events of a predetermined type during the one or more vehicle trip segments according to certain embodiments. In various embodiments, the one or more first driving events of the predetermined type correspond to high attention driving events. For example, the high attention driving events include events that require a high level of mental focus or alertness when operating the vehicle, such as when changing lanes, making turns, undergoing significant accelerations/deaccelerations, passing another vehicle, entering/exiting a highway ramp, transiting through a roundabout, events that occur immediately after a stop, etc. As an example, driving events that are not high attention include events such as idling, cruising on an open highway, driving with little or no traffic, etc.

In some embodiments, in addition to the telematics data, vehicle environment data collected or received by the mobile device are analyzed to determine the one or more first driving events. For example, location data (e.g., GPS data) can be analyzed to determine that the vehicle is traveling in areas that require high levels of mental focus or alertness (e.g., winding roads, hilly roads, rough terrain, etc.). As an example, the location data can be analyzed to determine when the vehicle is making turns, entering/exiting highway ramps, etc. For example, traffic data and/or weather data can be analyzed to determine that the vehicle is operating in environments that require high levels of mental focus or alertness (e.g., fog, snowstorm, traffic congestion, road constructions, etc.).

At the process 130, one or more second driving events of the predetermined type during which the user interacts with the mobile device are determined according to certain embodiments. In some embodiments, the one or more second driving events indicate mobile device usage during the high attention driving events. In various embodiments, the one or more second driving events are selected from the one or more first driving events.

In some embodiments, the one or more second driving events of the predetermined type are determined by correlating the telematics data and the device interaction data. For example, the telematics data may show that the vehicle is making lane changes while the device interaction data may show that the user is texting on the mobile device at the same time. As an example, correlation of the telematics data and the device interaction data will indicate that the user was interacting with the mobile device by texting while a lane change was taking place. For example, the telematics data may show that the vehicle is completing a left turn while the device interaction data may show that the user is swiping on a screen of the mobile device at the same time. As an example, correlation of the telematics data and the device interaction data will indicate that the user was interacting with the mobile device by playing with the mobile device while a left turn was taking place. For example, the telematics data may show that the vehicle is traveling on a highway on-ramp while the device interaction data may show that the user is dialing a phone number on the mobile device at the same time. As an example, correlation of the telematics data and the device interaction data will indicate that the user was interacting with the mobile device by making a phone call while a highway entrance was taking place.

In certain embodiments, the one or more second driving events of the predetermined type are determined by correlating the telematics data, the device interaction data, and the vehicle environment data. For example, the telematics data and the vehicle environment data may show that the vehicle is traveling in a congested urban area while the device interaction data may show that the user is constantly viewing the mobile device at the same time. As an example, correlation of the telematics data, the device interaction data, and the vehicle environment data will indicate that the user was interacting with the mobile device by frequently looking at the mobile device while engaged in stop and go traffic. For example, the telematics data and the vehicle environment data may show that the vehicle is moving in a rainstorm while the device interaction data may show that the user is interacting with an application on the mobile device at the same time. As an example, correlation of the telematics data, the device interaction data, and the vehicle environment data will indicate that the user was interacting with the mobile device by playing with the mobile device while traveling under hazardous road conditions.

In some embodiments, the one or more first driving events of the predetermined type correspond to one or more first levels of mental focus. For example, each of the one or more first levels is larger than a predetermined level. As an example, any level that is larger than the predetermined level corresponds to a high attention driving event. In certain embodiments, the more second driving events of the predetermined type correspond to one or more second levels of mental focus. For example, each of the one or more second levels is larger than the predetermined level. In various embodiments, the one or more second levels are selected from the one or more first levels.

At the process 140, a ratio of the number of the one or more second driving events to the number of the one or more first driving events is calculated according to certain embodiments. In various embodiments, the ratio compares the number of high attention driving events in which mobile device usage was detected to the total number of high attention driving events. For example, a high value of the ratio would indicate that the driver of the vehicle was not using the mobile device because the driver was focused on driving instead of interacting with the mobile device.

At the process 150, whether or not the user of the mobile device is the driver of the vehicle during the one or more vehicle trip segments is determined by comparing the ratio to a predetermined threshold according to certain embodiments. In some embodiments, if the ratio is less than the predetermined threshold, the user of the mobile device is determined to be the driver of the vehicle during the one or more vehicle trip segments. For example, the number of the one or more first driving events is 15 and the number of the one or more second driving events is 3. As an example, if the predetermined threshold is set to 0.25, then the ratio is less than the predetermined threshold. For example, the user of the mobile device is attributed to the driver of the vehicle because mobile device usage during the high attention driving events was relatively low when compared to the total number of high attention driving events. In certain embodiments, determining whether or not the user of the mobile device is the driver of the vehicle during the one or more vehicle trip segments is based upon using various machine learning methods, such as clustering, dimensionality reduction, model reduction, regression, etc.

In some embodiments, if the ratio is greater than the predetermined threshold, the user of the mobile device is determined not to be the driver of the vehicle during the one or more vehicle trip segments. For example, the number of the one or more first driving events is 15 and the number of the one or more second driving events is 8. As an example, if the predetermined threshold is set to 0.25, then the ratio is greater than the predetermined threshold. For example, the user of the mobile device is not attributed to the driver of the vehicle because mobile device usage during the high attention driving events was relatively high when compared to the total number of high attention driving events. As an example, the user of the mobile device can be attributed to another individual (e.g., a passenger) in the vehicle.

In certain embodiments, determining whether or not the user of the mobile device is the driver of the vehicle can be used in other insurance related applications, such as insurance discount calculations. For example, a probability value may be determined for whether or not the user of the mobile device is the driver of the vehicle. As an example, if it is determined that there is a 65% probability that the user of the mobile device is the driver of the vehicle for a given trip, then the trip may be assigned a 65% weight for insurance discount purposes. For example, if it is determined that the user of the mobile device is the passenger of the vehicle for a given trip, then the trip may be assigned a large weight for insurance discount purposes because the driver was not using the mobile device during the trip and thus not distracted.

Figure 2A:
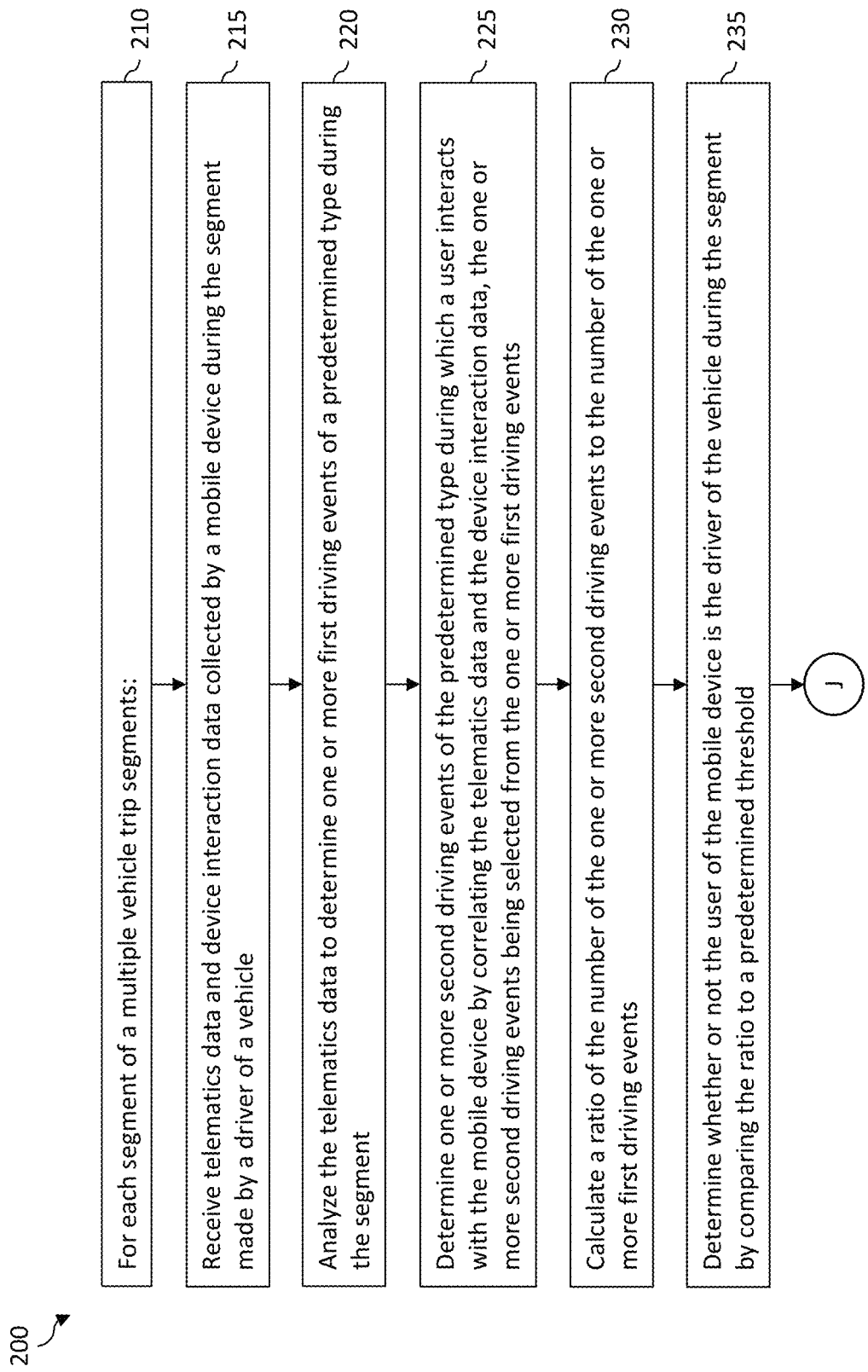
FIG. 2A and FIG. 2B show a simplified method for determining whether a user of a mobile device is a vehicle driver during multiple vehicle trips according to certain embodiments of the present disclosure.
Figure 2B:
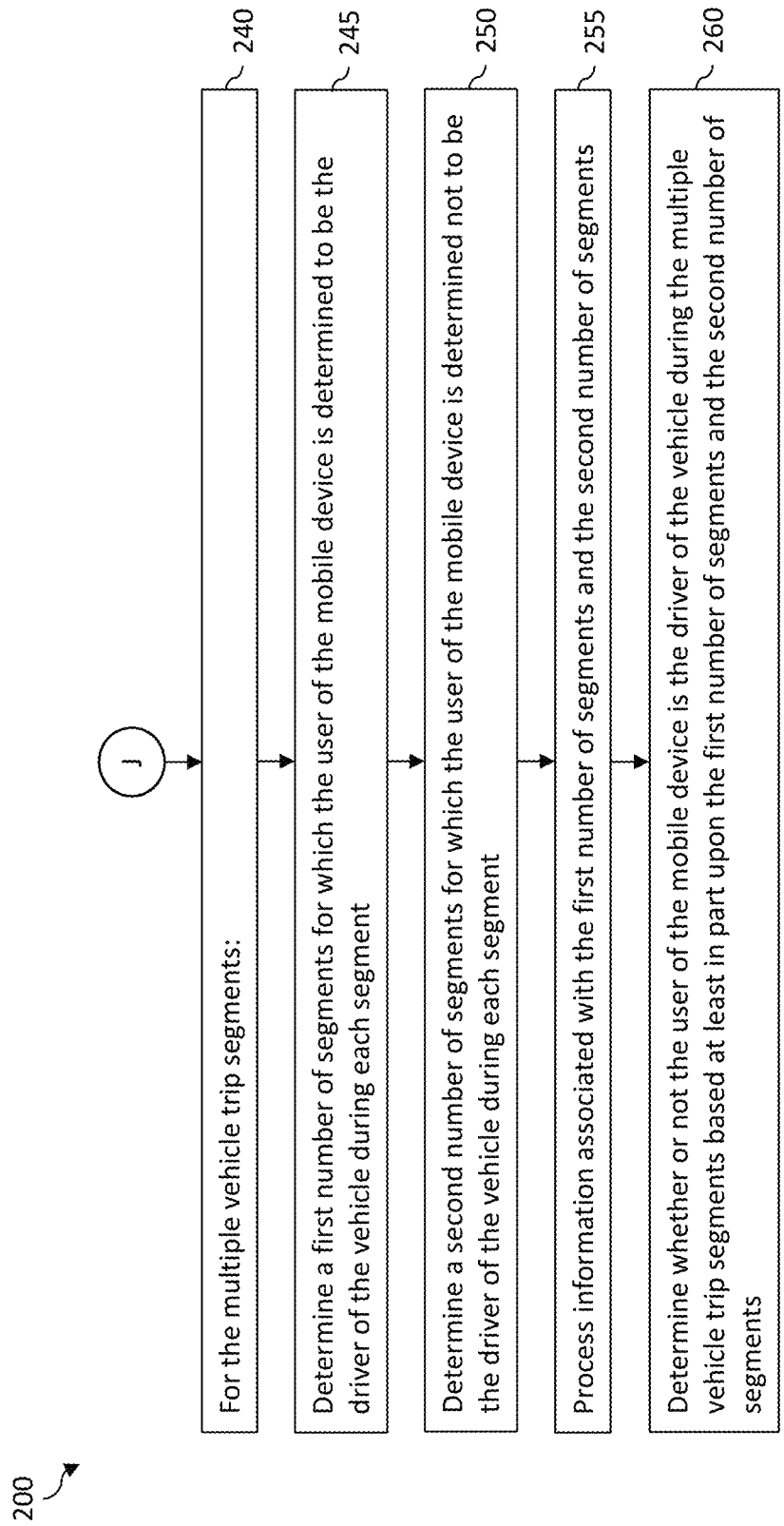

FIG. 2A and FIG. 2B show a simplified method for determining whether a user of a mobile device is a driver of a vehicle during multiple vehicle trip segments according to certain embodiments of the present disclosure. The figures are merely examples, which should not unduly limit the scope of the claims. One of ordinary skill in the art would recognize many variations, alternatives, and modifications. The method 200 includes processes 210-235 for analyzing each trip segment and processes 240-260 for analyzing the multiple trip segments as a whole. For each segment of the multiple vehicle trip segments, the method 200 includes process 215 for receiving telematics data and device interaction data, process 220 for determining first driving events, process 225 for determining second driving events, process 230 for calculating a ratio based upon the first driving events and the second driving events, and process 235 for determining whether the user of the mobile device is the driver of the vehicle during each segment. For the multiple vehicle trip segments, the method includes process 245 for determining a first number of segments, process 250 for determining a second number of segments, process 255 for processing the first number of segments and the second number of segments, and process 260 for determining whether the user of the mobile device is the driver of the vehicle during the multiple vehicle trip segments. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

Starting at the process 210, each trip segment of the multiple vehicle trip segments is analyzed according to certain embodiments. At the process 215, the telematics data and the device interaction data are collected by the mobile device during each trip segment according to some embodiments. In certain embodiments, the telematics data indicate driving maneuvers made during each trip segment, and the device interaction data indicate user interactions with the mobile device during each trip segment. In various embodiments, the telematics data and/or the device interaction data are collected by one or more sensors in the mobile device (e.g., accelerometers, gyroscopes, GPS sensors, cameras, etc.). In some embodiments, each trip segment of the multiple vehicle trip segments is selected based on factors such as driving time, driving distance, fuel cost, etc.

At the process 220, the telematics data are analyzed to determine one or more first driving events of a predetermined type during each trip segment according to certain embodiments. In various embodiments, the one or more first driving events of the predetermined type correspond to high attention driving events that require a high level of mental focus or alertness when operating the vehicle. In some embodiments, vehicle environment data collected or received by the mobile device are also analyzed to determine the one or more first driving events. For example, location data, traffic data, and/or weather data can be analyzed to determine that the vehicle is operating in areas/environments that require high levels of mental focus.

At the process 225, one or more second driving events of the predetermined type during which the user interacts with the mobile device are determined during each trip segment according to certain embodiments. In various embodiments, the one or more second driving events are selected from the one or more first driving events.

In some embodiments, the one or more second driving events of the predetermined type are determined by correlating the telematics data and the device interaction data. In certain embodiments, the one or more second driving events of the predetermined type are determined by correlating the telematics data, the device interaction data, and the vehicle environment data. In some embodiments, the one or more first driving events of the predetermined type correspond to one or more first levels of mental focus, and the one or more second driving events of the predetermined type correspond to one or more second levels of mental focus. For example, each of the one or more first levels and each of the one or more second levels is larger than a predetermined level. In various embodiments, the one or more second levels are selected from the one or more first levels.

At the process 230, a ratio of the number of the one or more second driving events to the number of the one or more first driving events is calculated during each trip segment according to certain embodiments. At the process 235, whether or not the user of the mobile device is the driver of the vehicle during each trip segment is determined by comparing the ratio to a predetermined threshold according to certain embodiments. In some embodiments, if the ratio is less than the predetermined threshold, the user of the mobile device is determined to be the driver of the vehicle. In certain embodiments, if the ratio is greater than the predetermined threshold, the user of the mobile device is determined not to be the driver of the vehicle.

Starting at the process 240, the multiple vehicle trip segments are analyzed according to certain embodiments. At the process 245, the first number of segments for which the user of the mobile device is the driver of the vehicle during each segment is determined according to some embodiments. At the process 250, the second number of segments for which the user of the mobile device is not the driver of the vehicle during each segment is determined according to certain embodiments. In various embodiments, the sum of the first number of segments and the second number of segments equals to a total number of the multiple vehicle trip segments. In some embodiments, the first number of segments is equal to zero and the second number of segments is equal to the total number of the multiple vehicle trip segments. In certain embodiments, the second number of segments is equal to zero and the first number of segments is equal to the total number of the multiple vehicle trip segments.

At the process 255, information associated with the first number of segments and the second number of segments are processed according to certain embodiments. For example, comparisons are made between the first number of segments and the second number of segments. At the process 260, whether or not the user of the mobile device is the driver of the vehicle during the multiple vehicle trip segments is determined based at least in part upon the first number of segments and the second number of segments according to certain embodiments.

In some embodiments, if the first number of segments and the second number of segments satisfy one or more first conditions, the user of the mobile device is determined to be the driver of the vehicle during the multiple vehicle trip segments. For example, the one or more first conditions include determining that the first number of segments is greater than the second number of segments. As an example, the one or more first conditions include determining that the first number of segments is greater than the second number of segments by a certain percentage (e.g., 50%). For example, the one or more first conditions include determining that the first number of segments is greater than a cutoff value while the second number of segments is less than the cutoff value.

In certain embodiments, if the first number of segments and the second number of segments satisfy one or more second conditions, the user of the mobile device is determined not to be the driver of the vehicle during the multiple vehicle trip segments. For example, the one or more second conditions include determining that the second number of segments is greater than the first number of segments. As an example, the one or more second conditions include determining that the second number of segments is greater than the first number of segments by a certain percentage (e.g., 50%). For example, the one or more second conditions include determining that the second number of segments is greater than a cutoff value while the first number of segments is less than the cutoff value.

Figure 3:
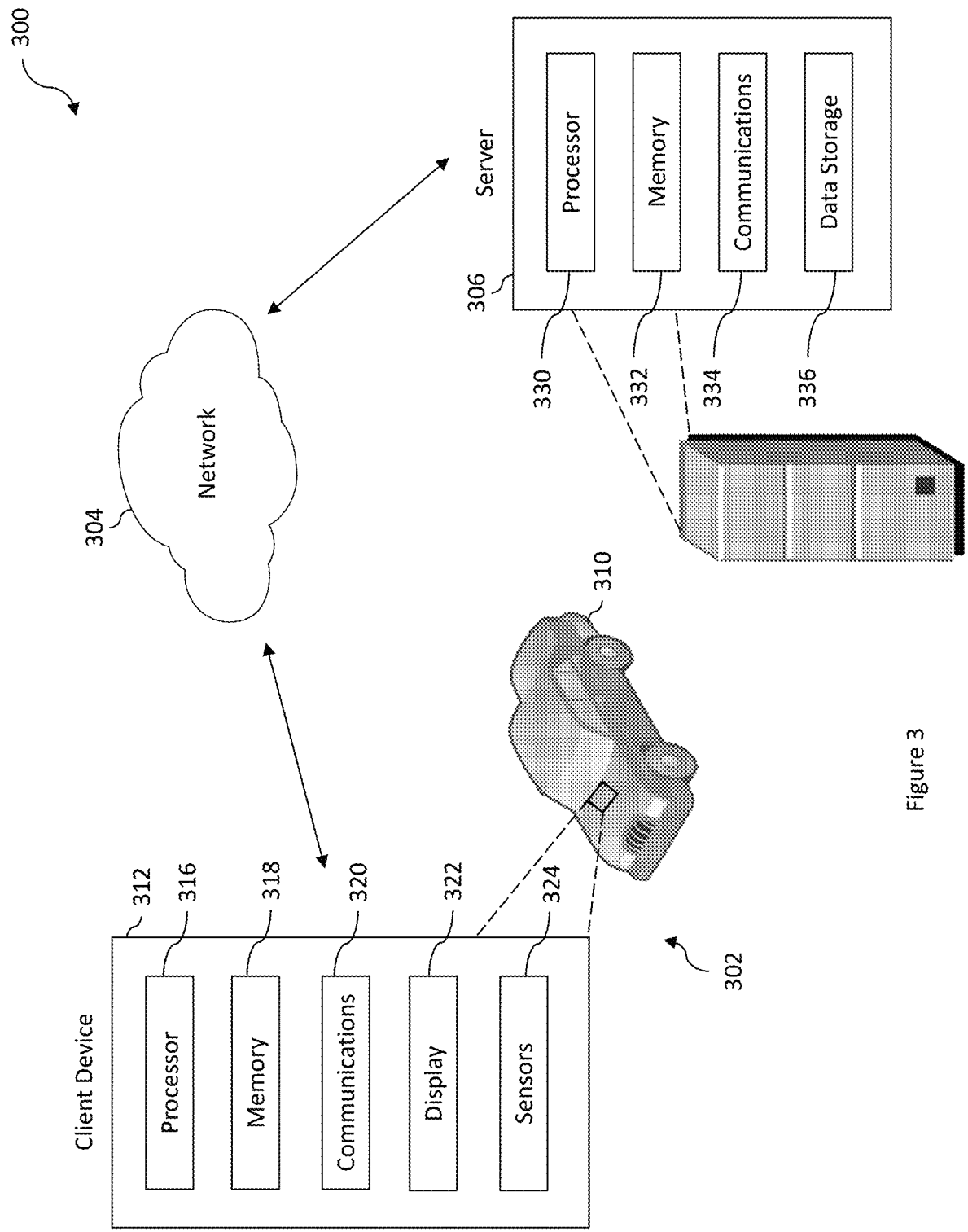
FIG. 3 shows a simplified system for determining whether a user of a mobile device is a vehicle driver according to certain embodiments of the present disclosure.

II. One or More Systems for Determining Whether a User of a Mobile Device is a Vehicle Driver According to Certain Embodiments FIG. 3 shows a simplified system for determining whether a user of a mobile device is a driver of a vehicle according to certain embodiments of the present disclosure. This figure is merely an example, which should not unduly limit the scope of the claims. One of ordinary skill in the art would recognize many variations, alternatives, and modifications. The system 300 includes a vehicle system 302, a network 304, and a server 306. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 300 is used to implement the method 100 and/or the method 200. According to certain embodiments, the vehicle system 302 includes a vehicle 310 and a client device 312 associated with the vehicle 310. For example, the client device 312 is a mobile device (e.g., a smartphone) located in the vehicle 310. For example, the client device 312 includes a processor 316 (e.g., a central processing unit (CPU), a graphics processing unit (GPU)), a memory 318 (e.g., random-access memory (RAM), read-only memory (ROM), flash memory), a communications unit 320 (e.g., a network transceiver), a display unit 322 (e.g., a touchscreen), and one or more sensors 324 (e.g., an accelerometer, a gyroscope, a magnetometer, a barometer, a GPS sensor).

In some embodiments, the vehicle 310 is operated by a driver. In certain embodiments, multiple vehicles 310 exist in the system 300 which are operated by respective drivers. In various embodiments, during one or more vehicle trip segments, the one or more sensors 324 collect data associated with vehicle operation, such as acceleration, braking, location, etc. According to some embodiments, the data are collected continuously, at predetermined time intervals, and/or based on a triggering event (e.g., when each sensor has acquired a threshold amount of sensor measurements). In various embodiments, the collected data represent the telematics data and/or the device interaction data in the method 100 and/or the method 200.

According to certain embodiments, the collected data are stored in the memory 318 before being transmitted to the server 306 using the communications unit 320 via the network 304 (e.g., via a local area network (LAN), a wide area network (WAN), the Internet). In some embodiments, the collected data are transmitted directly to the server 306 via the network 304. For example, the collected data are transmitted to the server 306 without being stored in the memory 318. In certain embodiments, the collected data are transmitted to the server 306 via a third party. For example, a data monitoring system stores any and all data collected by the one or more sensors 324 and transmits those data to the server 306 via the network 304 or a different network.

According to some embodiments, the server 306 includes a processor 330 (e.g., a microprocessor, a microcontroller), a memory 332, a communications unit 334 (e.g., a network transceiver), and a data storage 336 (e.g., one or more databases). In some embodiments, the server 306 is a single server, while in certain embodiments, the server 306 includes a plurality of servers with distributed processing. In FIG. 3, the data storage 336 is shown to be part of the server 306. In certain embodiments, the data storage 336 is a separate entity coupled to the server 306 via a network such as the network 304. In some embodiments, the server 306 includes various software applications stored in the memory 332 and executable by the processor 330. For example, these software applications include specific programs, routines, or scripts for performing functions associated with the method 100 and/or the method 200. As an example, the software applications include general-purpose software applications for data processing, network communication, database management, web server operation, and/or other functions typically performed by a server.

According to various embodiments, the server 306 receives, via the network 304, the data collected by the one or more sensors 324 using the communications unit 334 and stores the data in the data storage 336. For example, the server 306 then processes the data to perform one or more processes of the method 100 and/or one or more processes of the method 200.

According to certain embodiments, any related information determined or generated by the method 100 and/or the method 200 (e.g., first driving events, second driving events, etc.) are transmitted back to the client device 312, via the network 304, to be provided (e.g., displayed) to the user via the display unit 322.

In some embodiments, one or more processes of the method 100 and/or one or more processes of the method 200 are performed by the client device 312. For example, the processor 316 of the client device 312 processes the data collected by the one or more sensors 324 to perform one or more processes of the method 100 and/or one or more processes of the method 200.

Figure 4:
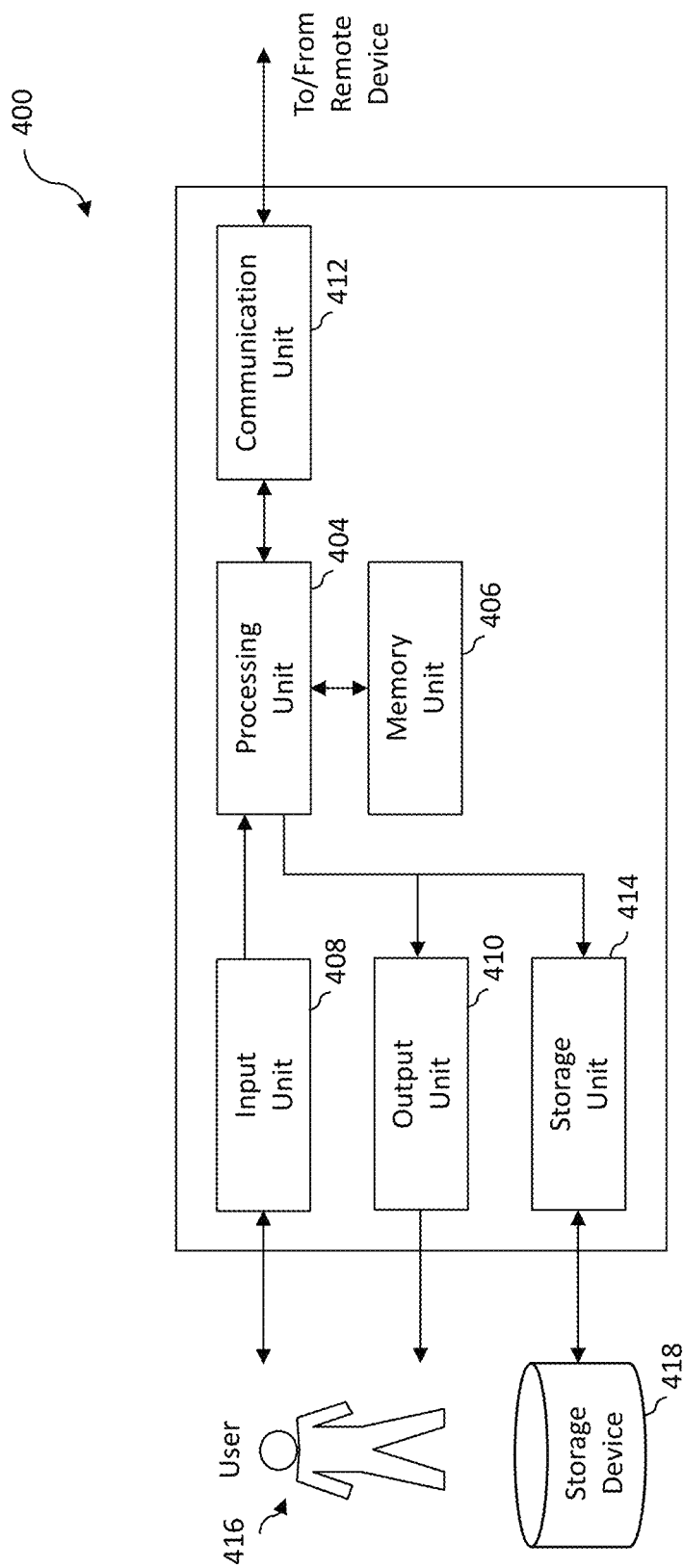
FIG. 4 shows a simplified computing device for determining whether a user of a mobile device is a vehicle driver according to certain embodiments of the present disclosure.

III. One or More Computing Devices for Determining Whether a User of a Mobile Device is a Vehicle Driver According to Certain Embodiments FIG. 4 shows a simplified computing device for determining whether a user of a mobile device is a driver of a vehicle according to certain embodiments of the present disclosure. This figure is merely an example, which should not unduly limit the scope of the claims. One of ordinary skill in the art would recognize many variations, alternatives, and modifications. The computing device 400 includes a processing unit 404, a memory unit 406, an input unit 408, an output unit 410, a communication unit 412, and a storage unit 414. In various embodiments, the computing device 400 is configured to be in communication with a user 416 and/or a storage device 418. In certain embodiments, the computing device 400 includes the client device 312 and/or the server 306 of FIG. 3. In some embodiments, the computing device 400 is configured to implement the method 100 of FIG. 1 and/or the method 200 of FIG. 2A and/or FIG. 2B. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the processing unit 404 is configured for executing instructions, such as instructions to implement the method 100 of FIG. 1 and/or the method 200 of FIG. 2A and/or FIG. 2B. In some embodiments, the executable instructions are stored in the memory unit 406. In certain embodiments, the processing unit 404 includes one or more processing units (e.g., in a multi-core configuration) . In some embodiments, the processing unit 404 includes and/or is communicatively coupled to one or more modules for implementing the methods and systems described in the present disclosure. In certain embodiments, the processing unit 404 is configured to execute instructions within one or more operating systems. In some embodiments, upon initiation of a computer-implemented method, one or more instructions is executed during initialization. In certain embodiments, one or more operations is executed to perform one or more processes described herein. In some embodiments, an operation may be general or specific to a particular programming language (e.g., C, C++, Java, or other suitable programming languages, etc.).

In various embodiments, the memory unit 406 includes a device allowing information, such as executable instructions and/or other data to be stored and retrieved. In some embodiments, the memory unit 406 includes one or more computer readable media. In certain embodiments, the memory unit 406 includes computer readable instructions for providing a user interface, such as to the user 416, via the output unit 410. In some embodiments, a user interface includes a web browser and/or a client application. For example, a web browser enables the user 416 to interact with media and/or other information embedded on a web page and/or a website. In certain embodiments, the memory unit 406 includes computer readable instructions for receiving and processing an input via the input unit 408. In some embodiments, the memory unit 406 includes RAM such as dynamic RAM (DRAM) or static RAM (SRAM), ROM, erasable programmable read-only memory (EPROM), electrically erasable programmable read-only memory (EEPROM), and/or non-volatile RAM (NVRAM).

In various embodiments, the input unit 408 is configured to receive input (e.g., from the user 416). In some embodiments, the input unit 408 includes a keyboard, a pointing device, a mouse, a stylus, a touch sensitive panel (e.g., a touch pad or touch screen), a gyroscope, an accelerometer, a position sensor (e.g., GPS sensor), and/or an audio input device. In certain embodiments, the input unit 408 is configured to function as both an input unit and an output unit.

In various embodiments, the output unit 410 includes a media output unit configured to present information to the user 416. In some embodiments, the output unit 410 includes any component capable of conveying information to the user 416. In certain embodiments, the output unit 410 includes an output adapter such as a video adapter and/or an audio adapter. For example, the output unit 410 is operatively coupled to the processing unit 404 and/or a visual display device to present information to the user 416 (e.g., a liquid crystal display (LCD), a light emitting diode (LED) display, an organic light emitting diode (OLED) display, a cathode ray tube (CRT) display, a projected display, etc.). As an example, the output unit 410 is operatively coupled to the processing unit 404 and/or an audio display device to present information to the user 416 (e.g., a speaker arrangement or headphones).

In various embodiments, the communication unit 412 is configured to be communicatively coupled to a remote device. In some embodiments, the communication unit 412 includes a wired network adapter, a wireless network adapter, a wireless data transceiver for use with a mobile phone network (e.g., 3G, 4G, 5G, Bluetooth, near-field communication (NFC), etc.), and/or other mobile data networks. In certain embodiments, other types of short-range or long-range networks may be used. In some embodiments, the communication unit 412 is configured to provide email integration for communicating data between a server and one or more clients.

In various embodiments, the storage unit 414 is configured to enable communication between the computing device 400 and the storage device 418. In some embodiments, the storage unit 414 is a storage interface. For example, the storage interface is any component capable of providing the processing unit 404 with access to the storage device 418. In certain embodiments, the storage unit 414 includes an advanced technology attachment (ATA) adapter, a serial ATA (SATA) adapter, a small computer system interface (SCSI) adapter, a RAID controller, a SAN adapter, a network adapter, and/or any other component capable of providing the processing unit 404 with access to the storage device 418.

In various embodiments, the storage device 418 includes any computer-operated hardware suitable for storing and/or retrieving data. In certain embodiments, the storage device 418 is integrated in the computing device 400. In some embodiments, the storage device 418 includes a database such as a local database or a cloud database. In certain embodiments, the storage device 418 includes one or more hard disk drives. In some embodiments, the storage device 418 is external and is configured to be accessed by a plurality of server systems. In certain embodiments, the storage device 418 includes multiple storage units such as hard disks or solid state disks in a redundant array of inexpensive disks configuration. In some embodiments, the storage device 418 includes a storage area network and/or a network attached storage system.

IV. Examples of Certain Embodiments of the Present Disclosure

According to certain embodiments, a method for determining whether or not a user of a mobile device is a driver of a vehicle includes receiving telematics data and device interaction data collected by the mobile device during one or more vehicle trip segments. The one or more vehicle trip segments are made by the driver of the vehicle. Also, the method includes analyzing the telematics data to determine one or more first driving events of a predetermined type during the one or more vehicle trip segments. Additionally, the method includes determining one or more second driving events of the predetermined type during which the user interacts with the mobile device by correlating the telematics data and the device interaction data, where the one or more second driving events are selected from the one or more first driving events. Further, the method includes calculating a ratio of the number of the one or more second driving events to the number of the one or more first driving events. Moreover, the method includes determining whether or not the user of the mobile device is the driver of the vehicle during the one or more vehicle trip segments by comparing the ratio to a predetermined threshold. For example, the method is implemented according to at least FIG. 1.

According to some embodiments, a computing device for determining whether or not a user of a mobile device is a driver of a vehicle includes one or more processors and a memory storing instructions for execution by the one or more processors. The instructions, when executed, cause the one or more processors to receive telematics data and device interaction data collected by the mobile device during one or more vehicle trip segments. The one or more vehicle trip segments are made by the driver of the vehicle. Also, the instructions, when executed, cause the one or more processors to analyze the telematics data to determine one or more first driving events of a predetermined type during the one or more vehicle trip segments. Additionally, the instructions, when executed, cause the one or more processors to determine one or more second driving events of the predetermined type during which the user interacts with the mobile device by correlating the telematics data and the device interaction data, where the one or more second driving events are selected from the one or more first driving events. Further, the instructions, when executed, cause the one or more processors to calculate a ratio of the number of the one or more second driving events to the number of the one or more first driving events. Moreover, the instructions, when executed, cause the one or more processors to determine whether or not the user of the mobile device is the driver of the vehicle during the one or more vehicle trip segments by comparing the ratio to a predetermined threshold. For example, the computing device is implemented according to at least FIG. 3 and/or FIG. 4.

According to certain embodiments, a non-transitory computer-readable medium stores instructions for determining whether or not a user of a mobile device is a driver of a vehicle. The instructions are executed by one or more processors of a computing device. The non-transitory computer-readable medium includes instructions to receive telematics data and device interaction data collected by the mobile device during one or more vehicle trip segments. The one or more vehicle trip segments are made by the driver of the vehicle. Also, the non-transitory computer-readable medium includes instructions to analyze the telematics data to determine one or more first driving events of a predetermined type during the one or more vehicle trip segments. Additionally, the non-transitory computer-readable medium includes instructions to determine one or more second driving events of the predetermined type during which the user interacts with the mobile device by correlating the telematics data and the device interaction data, where the one or more second driving events are selected from the one or more first driving events. Further, the non-transitory computer-readable medium includes instructions to calculate a ratio of the number of the one or more second driving events to the number of the one or more first driving events. Moreover, the non-transitory computer-readable medium includes instructions to determine whether or not the user of the mobile device is the driver of the vehicle during the one or more vehicle trip segments by comparing the ratio to a predetermined threshold. For example, the non-transitory computer-readable medium is implemented according to at least FIG. 1, FIG. 3, and/or FIG. 4.

According to some embodiments, a method for determining whether or not a user of a mobile device is a driver of a vehicle during multiple vehicle trip segments includes analyzing each trip segment and the multiple trip segments as a whole. For each segment of the multiple vehicle trip segments, the method includes receiving telematics data and device interaction data collected by the mobile device during the segment made by the driver of the vehicle, analyzing the telematics data to determine one or more first driving events of a predetermined type during the segment, determining one or more second driving events of the predetermined type during which the user interacts with the mobile device by correlating the telematics data and the device interaction data, calculating a ratio of the number of the one or more second driving events to the number of the one or more first driving events, and determining whether or not the user of the mobile device is the driver of the vehicle during the segment by comparing the ratio to a predetermined threshold. The one or more second driving events are selected from the one or more first driving events. For the multiple vehicle trip segments, the method includes determining a first number of segments for which the user of the mobile device is determined to be the driver of the vehicle during each segment, determining a second number of segments for which the user of the mobile device is determined not to be the driver of the vehicle during each segment, processing information associated with the first number of segments and the second number of segments, and determining whether or not the user of the mobile device is the driver of the vehicle during the multiple vehicle trip segments based at least in part upon the first number of segments and the second number of segments. For example, the method is implemented according to at least FIG. 2A and/or FIG. 2B.

According to certain embodiments, a computing device for determining whether or not a user of a mobile device is a driver of a vehicle during multiple vehicle trip segments includes one or more processors and a memory storing instructions for execution by the one or more processors. For each segment of the multiple vehicle trip segments, the instructions, when executed, cause the one or more processors to receive telematics data and device interaction data collected by the mobile device during the segment made by the driver of the vehicle, analyze the telematics data to determine one or more first driving events of a predetermined type during the segment, determine one or more second driving events of the predetermined type during which the user interacts with the mobile device by correlating the telematics data and the device interaction data, calculate a ratio of the number of the one or more second driving events to the number of the one or more first driving events, and determine whether or not the user of the mobile device is the driver of the vehicle during the segment by comparing the ratio to a predetermined threshold. The one or more second driving events are selected from the one or more first driving events. For the multiple vehicle trip segments, the instructions, when executed, cause the one or more processors to determine a first number of segments for which the user of the mobile device is determined to be the driver of the vehicle during each segment, determine a second number of segments for which the user of the mobile device is determined not to be the driver of the vehicle during each segment, process information associated with the first number of segments and the second number of segments, and determine whether or not the user of the mobile device is the driver of the vehicle during the multiple vehicle trip segments based at least in part upon the first number of segments and the second number of segments. For example, the computing device is implemented according to at least FIG. 3 and/or FIG. 4.

According to some embodiments, a non-transitory computer-readable medium stores instructions for determining whether or not a user of a mobile device is a driver of a vehicle during multiple vehicle trip segments. The instructions are executed by one or more processors of a computing device. For each segment of the multiple vehicle trip segments, the non-transitory computer-readable medium includes instructions to receive telematics data and device interaction data collected by the mobile device during the segment made by the driver of the vehicle, analyze the telematics data to determine one or more first driving events of a predetermined type during the segment, determine one or more second driving events of the predetermined type during which the user interacts with the mobile device by correlating the telematics data and the device interaction data, calculate a ratio of the number of the one or more second driving events to the number of the one or more first driving events, and determine whether or not the user of the mobile device is the driver of the vehicle during the segment by comparing the ratio to a predetermined threshold. The one or more second driving events are selected from the one or more first driving events. For the multiple vehicle trip segments, the non-transitory computer-readable medium includes instructions to determine a first number of segments for which the user of the mobile device is determined to be the driver of the vehicle during each segment, determine a second number of segments for which the user of the mobile device is determined not to be the driver of the vehicle during each segment, process information associated with the first number of segments and the second number of segments, and determine whether or not the user of the mobile device is the driver of the vehicle during the multiple vehicle trip segments based at least in part upon the first number of segments and the second number of segments. For example, the non-transitory computer-readable medium is implemented according to at least FIG. 2A, FIG. 2B, FIG. 3, and/or FIG. 4.

V. One or More Systems and Methods for Determining Whether a Driver or a Passenger is Using the Driver's Mobile Device According to Some Embodiments According to certain embodiments, a system and/or a method for determining whether a driver or a passenger is using a mobile device of the driver during a trip includes analyzing the telematics data and device interaction data generated by the mobile device to determine usage of the mobile device during high attention driving events. For example, the high attention driving events include events that require a high level of mental focus/energy such as changing lanes, making turns, overtaking/passing another vehicle, entering/exiting a highway ramp, transiting through a roundabout, etc. In some embodiments, a total number of high attention driving events is determined by analyzing the telematics data. In certain embodiments, the high attention driving events are correlated with the device interaction data to determine a number of high attention driving events involving user interactions with the mobile device. In some embodiments, a ratio indicating whether the driver is using the mobile device is calculated by comparing the number of high attention driving events involving user interactions with the mobile device to the total number of high attention driving events. In certain embodiments, the calculated ratio indicating whether the driver is using the mobile device is compared to a predefined threshold ratio (e.g., 25%). For example, if the calculated ratio is less than the threshold ratio, then the driver is determined to be using the mobile device during the trip. As an example, if the calculated ratio is greater than the threshold ratio, then the passenger is determined to be using the mobile device during the trip. According to various embodiments, the trip may be partitioned into a plurality of segments. For example, a ratio indicating whether the driver is using the mobile device is calculated for each of the plurality of segments and compared to the threshold ratio. As an example, an overall ratio indicating whether the driver is using the mobile device can be determined based upon analyzing the calculated ratios for the plurality of segments.

According to some embodiments, a system and/or a method for determining which vehicle occupant is using a mobile device of a driver during a vehicle trip includes collecting telematics data and device interaction data generated by the mobile device; analyzing the telematics data to determine a total number of high attention driving events; analyzing the telematics data and the device interaction data to determine a number of high attention driving events involving user interactions with the mobile device; calculating a ratio indicating whether the driver is using the mobile device by comparing the number of high attention driving events involving user interactions with the mobile device to the total number of high attention driving events; and/or comparing the calculated ratio indicating whether the driver is using the mobile device to a predefined threshold ratio. According to certain embodiments, the driver is determined to be using the mobile device if the calculated ratio is less than the threshold ratio, while the passenger is determined to be using the mobile device if the calculated ratio is greater than the threshold ratio.

According to certain embodiments, a system and/or a method for determining whether a driver or a passenger is using a mobile device of the driver during a trip includes analyzing the telematics data and device interaction data generated by the mobile device to determine usage of the mobile device during low attention driving events. For example, the low attention driving events include events that require a low level of mental focus/energy such as stopping, idling, cruising on a highway, driving in light traffic, etc. In some embodiments, a total number of user interactions with the mobile device is determined by analyzing the device interaction data. In certain embodiments, the low attention driving events are correlated with the device interaction data to determine a number of low attention driving events involving user interactions with the mobile device. In some embodiments, a ratio indicating whether the driver is using the mobile device is calculated by comparing the number of low attention driving events involving user interactions with the mobile device to the total number of user interactions with the mobile device. In certain embodiments, the calculated ratio indicating whether the driver is using the mobile device is compared to a predefined threshold ration (e.g., 75%). For example, if the calculated ratio is greater than the threshold ratio, then the driver is determined to be using the mobile device during the trip. As an example, if the calculated ratio less than the threshold ratio, then the passenger is determined to be using the mobile device during the trip. According to various embodiments, the trip may be partitioned into a plurality of segments. For example, a ratio indicating whether the driver is using the mobile device is calculated for each of the plurality of segments and compared to the threshold ratio. As an example, an overall ratio indicating whether the driver is using the mobile device can be determined based upon analyzing the calculated ratios for the plurality of segments.

According to some embodiments, a system and/or a method for determining which vehicle occupant is using a mobile device of a driver during a vehicle trip includes collecting telematics data and device interaction data generated by the mobile device; analyzing the device interaction data to determine a total number user interactions with the mobile device; analyzing the telematics data and the device interaction data to determine a number of low attention driving events involving user interactions with the mobile device; calculating a ratio indicating whether the driver is using the mobile device by comparing the number of low attention driving events involving user interactions with the mobile device to the total number of user interactions with the mobile device; and/or comparing the calculated ratio indicating whether the driver is using the mobile device to a predefined threshold ratio. According to certain embodiments, the driver is determined to be using the mobile device if the calculated ratio is greater than the threshold ratio, while the passenger is determined to be using the mobile device if the calculated ratio is less than the threshold ratio.

According to certain embodiments, a system and/or a method for determining whether a driver or a passenger is using a mobile device of the driver during a trip includes utilizing unsupervised machine learning with manual feature extraction. In some embodiments, the telematics data and device interaction data generated by the mobile device are analyzed to determine a plurality of driving instances involving user interactions with the mobile device. As an example, for each driving instance, a time window is created that includes a time period preceding the driving instance and a time period following the driving instance. In various embodiments, one or more driving features (e.g., making turns, entering/exiting an intersection, speed, etc.) are manually extracted for each window. For example, the one or more driving features are manually determined upon analysis of the telematics data. In certain embodiments, different weights are assigned to each of the one or more driving features to denote a relative importance of each of the one or more driving features. In some embodiments, the one or more driving features are normalized and/or scaled before being assigned with weights. According to various embodiments, a clustering/classification technique (e.g., k-means algorithm) is applied to all the windows to determine which one of the plurality of driving instances is associated with the driver and which one of the plurality of driving instances is associated with the passenger. In certain embodiments, data from multiple trips are analyzed by using unsupervised machine learning with manual feature extraction.

According to some embodiments, a system and/or a method for determining which vehicle occupant is using a mobile device of a driver during a vehicle trip includes collecting telematics data and device interaction data generated by the mobile device; analyzing the telematics data and the device interaction data to a plurality of driving instances involving user interactions with the mobile device; processing each of the plurality of driving instances involving user interactions with the mobile device to determine one or more driving features associated with each of the plurality of driving instances involving user interactions with the mobile device; and/or applying a clustering technique to the one or more driving features to classify which one of the plurality of driving instances is associated with the driver and which one of the plurality of driving instances is associated with a passenger.

According to certain embodiments, a system and/or a method for determining whether a driver or a passenger is using a mobile device of the driver during a trip includes utilizing unsupervised machine learning with automatic feature extraction. In some embodiments, the telematics data and device interaction data generated by the mobile device are analyzed to determine a plurality of driving instances involving user interactions with the mobile device. In various embodiments, each of the plurality of driving instances is processed using a model (e.g., a machine learning model such as an artificial neural network) to determine a feature vector associated with each of the plurality of driving instances. In certain embodiments, the machine learning model has been trained to automatically extract or determine the feature vector. According to various embodiments, a clustering/classification technique (e.g., k-means algorithm) is applied to all the feature vectors determine which one of the plurality of driving instances is associated with the driver and which one of the plurality of driving instances is associated with the passenger. In certain embodiments, data from multiple trips are analyzed by using unsupervised machine learning with automatic feature extraction.

According to some embodiments, a system and/or a method for determining which vehicle occupant is using a mobile device of a driver during a vehicle trip includes collecting telematics data and device interaction data generated by the mobile device; analyzing the telematics data and the device interaction data to a plurality of driving instances involving user interactions with the mobile device; processing each of the plurality of driving instances with a trained machine learning model to determine a feature vector associated with each of the plurality of driving instances involving user interactions with the mobile device; and/or applying a clustering technique to each feature vector to determine which one of the plurality of driving instances is associated with the driver and which one of the plurality of driving instances is associated with a passenger.

According to certain embodiments, a system and/or a method for determining whether a driver or a passenger is using a mobile device of the driver during a trip includes utilizing supervised machine learning. In some embodiments, the telematics data and device interaction data generated by the mobile device are analyzed to determine a plurality of driving instances involving user interactions with the mobile device. For example, each of the plurality of driving instances is labeled to indicate that each instance is either associated with the driver or the passenger. According to various embodiments, the plurality of driving instances is processed by a model (e.g., a machine learning model such as an artificial neural network) to train the model to recognize the association of each instance with either the driver or the passenger. For example, training is complete when a loss/cost function associated with the plurality of driving instances is sufficiently reduced (e.g., minimized).

According to some embodiments, a system and/or a method for determining which vehicle occupant is using a mobile device of a driver during a vehicle trip includes collecting telematics data and device interaction data generated by the mobile device; analyzing the telematics data and the device interaction data to a plurality of driving instances involving user interactions with the mobile device, where each of the plurality of driving instances indicates whether the instance is associated with the driver or the passenger; and/or processing the plurality of driving instances with a machine learning model to train the machine learning model to recognize the association of each instance with either the driver or a passenger.

According to certain embodiments, a system and/or a method for validating whether a driver or a passenger is using a mobile device of the driver in view of multiple mobile devices within a vehicle during a trip includes analyzing the telematics data and device interaction data generated by a first mobile device and a second mobile device in the vehicle to determine whether a user of the first mobile device is the driver/passenger and whether a user of the second mobile device is the driver/passenger. In various embodiments, a classification technique is used to determine which user is the driver or passenger in the vehicle by classifying each driving instance involving user interactions associated with the first mobile device and the second mobile device. For example, the classification technique may be based upon analyzing usage of the mobile devices during high attention driving events and/or low attention driving events. As an example, the classification technique may be based upon unsupervised and/or supervised machine learning. In some embodiments, the classification technique is validated when the role of the user of the first mobile device and the role of the user of the second mobile device have been determined to be different. For example, with two mobile devices in the vehicle, only the activity of one of the mobile devices can be attributed to the driver. As an example, it is impossible to have the activity of both mobile devices being attributed the driver.

According to some embodiments, a system and/or a method for validating which vehicle occupant is using a mobile device of a driver in view of multiple mobile devices within a vehicle includes collecting respective telematics data and device interaction data generated by a first mobile device and a second mobile device in the vehicle; analyzing the telematics data and the device interaction data from the first mobile device to determine a first plurality of driving instances involving user interactions with the first mobile device; analyzing the telematics data and the device interaction data from the second mobile device to determine a second plurality of driving instances involving user interactions with the second mobile device; processing the first plurality of driving instances involving user interactions with the first mobile device by using a classification technique to determine whether a user of the first mobile device is the driver or a passenger in the vehicle; processing the second plurality of driving instances involving user interactions with the second mobile device by using the classification technique to determine whether a user of the second mobile device is the driver or the passenger in the vehicle; and/or validating the classification technique when the user of the first mobile device and the user for the second mobile device have been determined to be different.

According to certain embodiments, a system and/or a method for validating whether a driver or a passenger is using a mobile device of the driver in view of mobile device positions within a vehicle during a trip includes using a classification technique to classify each driving instance involving user interactions with the mobile device as being associated with either the driver or the passenger. For example, the classification technique may be based upon analyzing mobile device usage during high attention driving events and/or low attention driving events. As an example, the classification technique may be based upon unsupervised and/or supervised machine learning. In various embodiments, the classification technique is tested with positioning data of the mobile device within the vehicle to determine the validity of the classification technique. For example, if the mobile device is positioned in a rear seat of the vehicle, then it is impossible to attribute the activity of the mobile device to the driver.

According to some embodiments, a system and/or a method for validating which vehicle occupant is using a mobile device of a driver in view of mobile device positions within a vehicle includes collecting telematics data and device interaction data generated by the mobile device; analyzing the telematics data and the device interaction data to a plurality of driving instances involving user interactions with the mobile device; processing the plurality of driving instances involving user interactions with the mobile device by using a classification technique; and/or validating the classification technique with positioning data of mobile device within the vehicle.

VI. Examples of Machine Learning According to Certain Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

VII. Additional Considerations According to Certain Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for determining whether or not a user of a mobile device is a driver of a vehicle, the method comprising:
receiving telematics data and device interaction data collected by the mobile device during one or more vehicle trip segments, the one or more vehicle trip segments being made by the driver of the vehicle;
analyzing the telematics data to determine one or more first driving events of a predetermined type during the one or more vehicle trip segments, wherein the predetermined type comprises driving events that include at least one of changing lanes, making turns, accelerations above an acceleration threshold level, deaccelerations above a deceleration threshold level, passing another vehicle, entering a highway ramp, exiting the highway ramp, or transiting through a roundabout;
determining one or more second driving events of the predetermined type during which the user interacts with the mobile device by correlating the telematics data and the device interaction data, the one or more second driving events being selected from the one or more first driving events;

calculating a ratio of a number of the one or more second driving events to the number of the one or more first driving events;

determining whether or not the user of the mobile device is the driver of the vehicle during the one or more vehicle trip segments by comparing the ratio to a predetermined threshold; and when the user of the mobile device is determined to be the driver of the vehicle during the one or more vehicle trip segments by comparing the ratio to the predetermined threshold, transmitting an instruction to a remote server, the instruction comprising a determination that the user of the mobile device is the driver of the vehicle.

2. The computer-implemented method of claim 1, wherein:

the determining whether or not the user of the mobile device is the driver of the vehicle by comparing the ratio to the predetermined threshold includes:
if the ratio is less than the predetermined threshold, determining that the user of the mobile device is the driver of the vehicle during the one or more vehicle trip segments;

the instruction is configured to adjust a driving behavior-based insurance premium value for the user; and the instruction is stored at the remote server.

3. The computer-implemented method of claim 2, wherein the determining whether or not the user of the mobile device is the driver of the vehicle by comparing the ratio to the predetermined threshold includes:

if the ratio is greater than the predetermined threshold, determining that the user of the mobile device is not the driver of the vehicle during the one or more vehicle trip segments.

4. The computer-implemented method of claim 2, wherein the one or more first driving events of the predetermined type correspond to one or more first levels of mental focus, each level of the one or more first levels being larger than a predetermined level.

5. The computer-implemented method of claim 4, wherein the one or more second driving events of the predetermined type correspond to one or more second levels of mental focus, the one or more second levels being selected from the one or more first levels, each level of the one or more second levels being larger than the predetermined level.

6. The computer-implemented method of claim 1, further comprising:

receiving vehicle environment data during the one or more vehicle trip segments.

7. The computer-implemented method of claim 6, wherein the determining the one or more second driving events of the predetermined type during which the user interacts with the mobile device further includes determining the one or more second driving events by correlating the telematics data, the device interaction data, and the vehicle environment data.

8. A computing device for determining whether or not a user of a mobile device is a driver of a vehicle, the computing device comprising:

one or more processors; and a memory storing instructions that, when executed by the one or more processors, cause the one or more processors to:

receive telematics data and device interaction data collected by the mobile device during one or more vehicle trip segments, the one or more vehicle trip segments being made by the driver of the vehicle;

analyze the telematics data to determine one or more first driving events of a predetermined type during the one or more vehicle trip segments, wherein the predetermined type comprises driving events that include at least one of changing lanes, making turns, accelerations above an acceleration threshold level, deaccelerations above a deceleration threshold level, passing another vehicle, entering a highway ramp, exiting the highway ramp, or transiting through a roundabout;

determine one or more second driving events of the predetermined type during which the user interacts with the mobile device by correlating the telematics data and the device interaction data, the one or more second driving events being selected from the one or more first driving events;

calculate a ratio of a number of the one or more second driving events to the number of the one or more first driving events;

determine whether or not the user of the mobile device is the driver of the vehicle during the one or more vehicle trip segments by comparing the ratio to a predetermined threshold; and when the user of the mobile device is determined to be the driver of the vehicle during the one or more vehicle trip segments by comparing the ratio to the predetermined threshold, transmitting an instruction to a remote server, the instruction comprising a determination that the user of the mobile device is the driver of the vehicle.

9. The computing device of claim 8, wherein, the instructions that cause the one or more processors to determine whether or not the user of the mobile device is the driver of the vehicle by comparing the ratio to the predetermined threshold further comprise instructions that cause the one or more processors to:

if the ratio is less than the predetermined threshold, determine that the user of the mobile device is the driver of the vehicle during the one or more vehicle trip segments;

the instruction is configured to adjust a driving behavior-based insurance premium value for the user; and the instruction is stored at the remote server.

10. The computing device of claim 9, wherein, the instructions that cause the one or more processors to determine whether or not the user of the mobile device is the driver of the vehicle by comparing the ratio to the predetermined threshold further comprise instructions that cause the one or more processors to:

if the ratio is greater than the predetermined threshold, determine that the user of the mobile device is not the driver of the vehicle during the one or more vehicle trip segments.

11. The computing device of claim 9, wherein the one or more first driving events of the predetermined type correspond to one or more first levels of mental focus, each level of the one or more first levels being larger than a predetermined level.

12. The computing device of claim 11, wherein the one or more second driving events of the predetermined type correspond to one or more second levels of mental focus, the one or more second levels being selected from the one or more first levels, each level of the one or more second levels being larger than the predetermined level.

13. The computing device of claim 8, wherein the instructions, when executed by the one or more processors, further cause the one or more processors to:

receive vehicle environment data during the one or more vehicle trip segments.

14. The computing device of claim 13, wherein:
determine the one or more second driving events further comprises determining the one or more second driving events by correlating the telematics data, the device interaction data, and the vehicle environment data.

15. A computer-implemented method for determining whether or not a user of a mobile device is a driver of a vehicle during one or more vehicle trip segments, the one or more vehicle trip segments being made by the driver of the vehicle, the method comprising:
for each segment of the one or more vehicle trip segments:
receiving telematics data and device interaction data collected by the mobile device during the segment made by the driver of the vehicle;
analyzing the telematics data to determine one or more first driving events of a predetermined type during the segment, wherein the predetermined type comprises driving events that include at least one of changing lanes, making turns, accelerations above an acceleration threshold level, deaccelerations above a deceleration threshold level, passing another vehicle, entering a highway ramp, exiting the highway ramp, or transiting through a roundabout;
determining one or more second driving events of the predetermined type during which the user interacts with the mobile device by correlating the telematics data and the device interaction data, the one or more second driving events being selected from the one or more first driving events;
calculating a ratio of a number of the one or more second driving events to the number of the one or more first driving events;
determining whether or not the user of the mobile device is the driver of the vehicle during the segment by comparing the ratio to a predetermined threshold; and
for the one or more vehicle trip segments:
determining a first number of segments of the one or more vehicle trip segments for which the user of the mobile device is determined to be the driver of the vehicle during each segment;
determining a second number of segments of the one or more vehicle trip segments for which the user of the mobile device is determined not to be the driver of the vehicle during each segment;
processing information associated with the first number of segments and the second number of segments;
determining whether or not the user of the mobile device is the driver of the vehicle during the one or more vehicle trip segments based at least in part upon the first number of segments and the second number of segments; and when the user of the mobile device is determined to be the driver of the vehicle during the one or more vehicle trip segments by comparing the ratio to the predetermined threshold, transmitting an instruction to a remote server, the instruction comprising a determination that the user of the mobile device is the driver of the vehicle during the one or more vehicle trip segments.

16. The computer-implemented method of claim 15, wherein the determining whether or not the user of the mobile device is the driver of the vehicle during the one or more vehicle trip segments based at least in part upon the first number of segments and the second number of segments includes:
if the first number of segments and the second number of segments satisfy one or more first conditions, determining that the user of the mobile device is the driver of the vehicle during the one or more vehicle trip segments;
the instruction is configured to adjust a driving behavior-based insurance premium value for the user; and
the instruction is stored in the remote server.

17. The computer-implemented method of claim 16, wherein the determining whether or not the user of the mobile device is the driver of the vehicle during the one or more vehicle trip segments based at least in part upon the first number of segments and the second number of segments further includes:
if the first number of segments and the second number of segments satisfy one or more second conditions, determining that the user of the mobile device is not the driver of the vehicle during the one or more vehicle trip segments.

18. The computer-implemented method of claim 15, wherein:
the first number of segments is equal to zero; and
the second number of segments is equal to a total number of the one or more vehicle trip segments.

19. The computer-implemented method of claim 15, wherein:
the second number of segments is equal to zero; and
the first number of segments is equal to a total number of the one or more vehicle trip segments.

20. The computer-implemented method of claim 15, further comprising:
for each segment of the one or more vehicle trip segments:
receiving vehicle environment data during the one or more vehicle trip segments; and
wherein determining the one or more second driving events of the predetermined type during which the user interacts with the mobile device further comprises determining the one or more second driving events by correlating the telematics data, the device interaction data, and the vehicle environment data.

* * * * *